United States Patent
Baek

(10) Patent No.: US 6,926,434 B2
(45) Date of Patent: Aug. 9, 2005

(54) HEADLAMP FIXING STRUCTURE FOR VEHICLE

(75) Inventor: Ji-Hoon Baek, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 28 days.

(21) Appl. No.: 10/749,208

(22) Filed: Dec. 30, 2003

(65) Prior Publication Data

US 2005/0073854 A1 Apr. 7, 2005

(30) Foreign Application Priority Data

Oct. 6, 2003 (KR) .............................. 10-2003-0069160

(51) Int. Cl.⁷ .............................................. F21V 21/08
(52) U.S. Cl. ...................... 362/549; 362/368; 362/382
(58) Field of Search ................................ 362/549, 507, 362/546, 382, 368, 418, 420

(56) References Cited

U.S. PATENT DOCUMENTS 6,220,734 B1 * 4/2001 Muller ........................ 362/520
6,471,386 B2 * 10/2002 Oh .............................. 362/549
6,582,111 B2 * 6/2003 Iwase .......................... 362/520

FOREIGN PATENT DOCUMENTS

JP 06-321001 11/1994
JP 2002-142373 5/2002

* cited by examiner

*Primary Examiner*—Laura K. Tso
(74) *Attorney, Agent, or Firm*—Morgan Lewis & Bockius LLP

(57) ABSTRACT

A headlamp fixing structure for a vehicle is adapted with a buffering space, buffering gap, locking protruder, and tooth-shaped locking piece for minimizing damage upon a frontal impact. The structure also facilitates the assembly process and provides flexibility of adjusting an interval between the headlamp and hood panel.

4 Claims, 1 Drawing Sheet

HEADLAMP FIXING STRUCTURE FOR VEHICLE

CROSS-REFERENCE TO RELATED APPLICATIONS

This application claims priority to Korean Application No. 10-2003-0069160, filed on Oct. 6, 2003, the disclosure of which is incorporated fully herein by reference.

FIELD OF THE INVENTION

Generally, the present invention relates to a vehicle headlamp. More particularly, the invention relates to a headlamp fixing structure adapted to fix a periphery of the housing of a headlamp to the vehicle body.

BACKGROUND OF THE INVENTION

Generally, a headlamp is installed adjacent to a hood panel of a vehicle. Together these structures form the front appearance of the vehicle. The headlamp is closely mounted to the hood panel with a proper interval therebetween. However, the headlamp is often susceptible to damage in the event of a frontal collision.

SUMMARY OF THE INVENTION

An embodiment of the invention provides a headlamp fixing structure for a vehicle adapted to minimize damage to a headlamp resulting from a collision. The structure also facilitates the assembly process and allows for the interval between the headlamp and hood panel to be flexibly adjustable.

In a preferred embodiment, the headlamp fixing structure comprises a female bracket integrally formed around a housing of the headlamp and having an insertion groove. A male bracket is fixed at a vehicle body and formed with a supporting protruder inserted into the insertion groove. An insertion fixing means adjusts stepwise and maintains the depth of the supporting protruder inserted into the insertion groove.

BRIEF DESCRIPTION OF THE DRAWINGS

For a better understanding of the nature and objects of the present invention, reference should be made to the following detailed description read in conjunction with the accompanying drawings, in which.

DETAILED DESCRIPTION OF PREFERRED EMBODIMENTS

Figure 1:
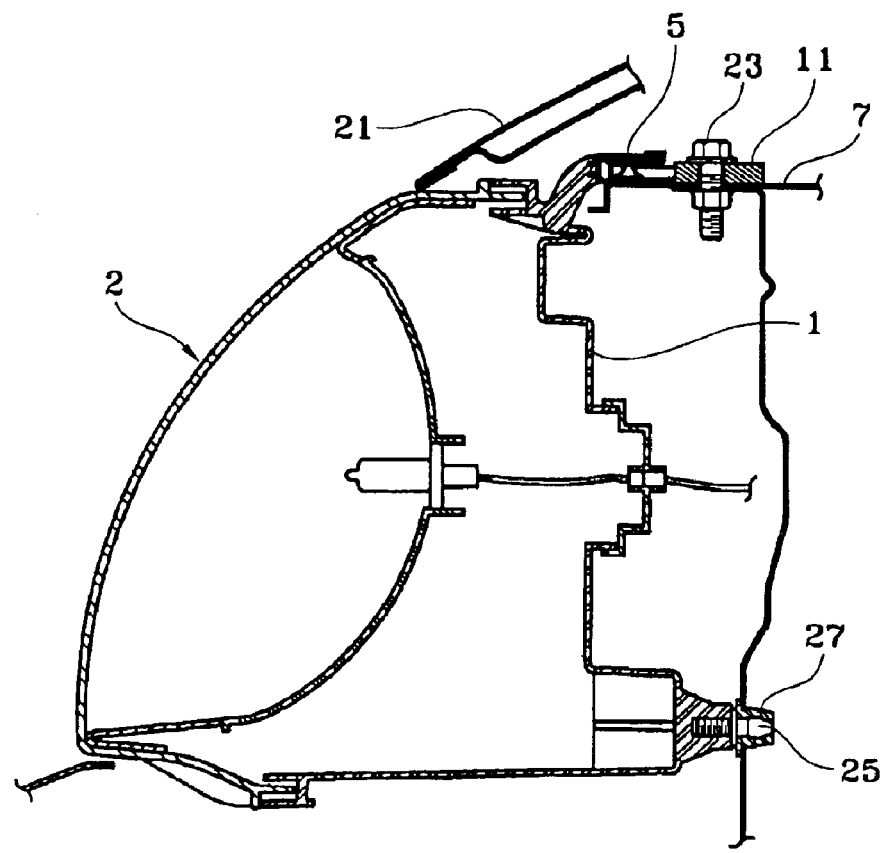
FIG. 1 is a cross-sectional view of an embodiment of the present invention.
Figure 2:
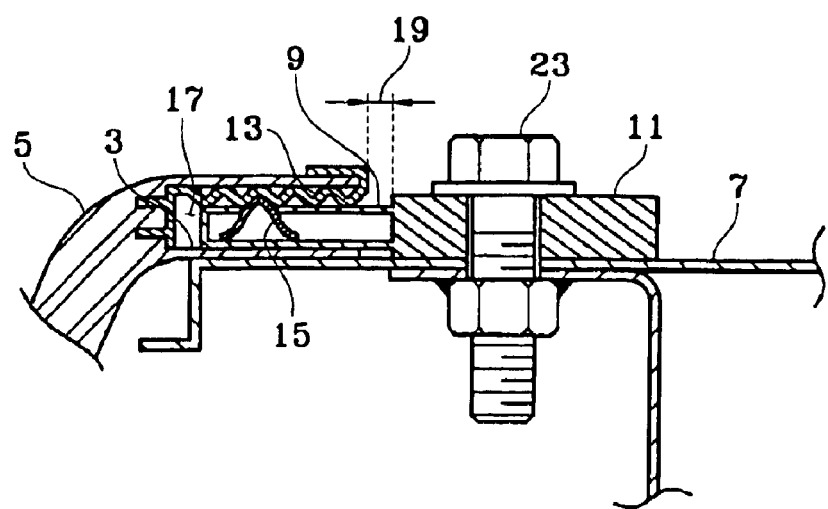
FIG. 2 is a cross-sectional view of an enlarged principle part of an embodiment of the present invention.

As shown in FIGS. 1 and 2, a headlamp fixing structure for a vehicle comprises a female bracket 5 integrally formed around a housing 1 of a headlamp 2 and having an insertion groove 3. A male bracket 11 fixed at a vehicle body 7 is formed with a supporting protruder 9 inserted into the insertion groove 3. An insertion fixing means adjusts stepwise and maintains the depth of the supporting protruder 9 inserted into the insertion groove 3.

The insertion fixing means includes a tooth-shaped locking piece 13 and a locking protruder 15. The tooth-shaped locking piece 13 is formed at the insertion groove 3 and the locking protruder 15 is formed at the supporting protruder 9 for being locked by the tooth-shaped locking piece 13. The tooth-shaped locking piece 13 and locking protruder 15 are made from resilient members.

The tooth-shaped locking piece 13 and locking protruder 15 are formed by bending resilient metal plates, as shown in the drawings, and are installed at the insertion groove 3 and the supporting protruder 9, respectively. However, it is also preferable that only one of either the tooth-shaped locking piece 13 or the locking protruder 15 is independently deformably made as a resilient member while the remaining one is integrally formed at either the insertion groove 3 or the supporting protruder 9.

The insertion groove 3 is formed to face the rear of the vehicle, while the supporting protruder 9 is formed to face the front of the vehicle. A buffering space 17 is formed between the inner side of the insertion groove 3 and the front end of the supporting protruder 9. A buffering gap 19 is formed between the female bracket 5 and the male bracket 11.

Once the headlamp 2 is mounted onto the vehicle body 7 with the buffering space 17 and buffering gap 19, the buffering space 17 and buffering gap 19 can absorb a light frontal collision by shifting the location of the locking protruder 15 locked by the tooth-shaped locking piece 13. Thereby, minimizing damage to the headlamp 2 and the fixing part between the headlamp 2 and the vehicle body 7.

Securing the headlamp 2 to the vehicle body 7 will now be described. After the male bracket 11 is fixed by a bolt 23 to the vehicle body 7, the insertion groove 3 of the female bracket 5 is inserted into the supporting protruder 9 of the male bracket 11. Simultaneously, a clip 25, integrally formed at the bottom of the housing 1, as shown in FIG. 1, is pushed into a retainer 27 embedded inside the vehicle body 7. The fixed state of the headlamp 2 to the vehicle body 7 can be varied according to the location of the locking protruder 15 locked by the tooth-shaped locking piece 13. Accordingly, the inserted depth of the supporting protruder 9 into the insertion groove 3 is adjusted by the locking protruder 15 locked stepwise by the tooth-shaped locking piece 13.

The fixed state of the headlamp 2 to the vehicle body 7 is variable, according to the state of a hood panel 21. The interval formed between the hood panel 21 and the headlamp 2 can easily be adjusted.

As apparent from the foregoing, there is an advantage in the headlamp fixing structure for a vehicle according to the present invention in that the structure is adapted with a buffering space, buffering gap, locking protruder, and tooth-shaped locking piece to minimize damage to the headlamp in the event of a vehicle collision. Another advantage is that the structure facilitates the assembly process and provides flexibility in adjusting the interval formed between the headlamp and hood panel.

What is claimed is:

1. A headlamp fixing structure for a vehicle, comprising:
- a female bracket integrally formed around a housing of a headlamp and provided with an insertion groove;
- a male bracket configured to be fixed at a vehicle body and provided with a supporting protruder inserted into said insertion groove; and
- means for adjusting stepwise and maintaining the depth of said supporting protruder inserted into said insertion groove.

2. The structure of claim 1, wherein said means comprises:
- a tooth-shaped locking piece formed at said insertion groove; and
- a locking protruder formed at said supporting protruder for being locked by said tooth-shaped locking piece.

3. The structure of claim 2, wherein said tooth-shaped locking piece and said locking protruder are made of resilient members.

4. The structure of claim 3, wherein said insertion groove is formed to face the rear of the vehicle;
- said supporting protruder is formed to face the front of the vehicle;
- a buffering space is formed between an inner side of said insertion groove and a front end of said supporting protruder; and
- a buffering gap is formed between said female bracket and said male bracket.

* * * * *